United States Patent
Zhao et al.

(10) Patent No.: US 9,473,977 B2
(45) Date of Patent: Oct. 18, 2016

(54) SYSTEMS AND METHODS FOR SAMOG BEARER MANAGEMENT

(71) Applicant: Qualcomm Incorporated, San Diego, CA (US)

(72) Inventors: Suli Zhao, San Diego, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/145,169

(22) Filed: May 3, 2016

(65) Prior Publication Data

US 2016/0249247 A1    Aug. 25, 2016

Related U.S. Application Data

(62) Division of application No. 13/776,644, filed on Feb. 25, 2013, now Pat. No. 9,357,430.

(60) Provisional application No. 61/719,244, filed on Oct. 26, 2012.

(51) Int. Cl.
*H04W 28/02* (2009.01)
*H04W 28/24* (2009.01)
(Continued)

(52) U.S. Cl.
CPC ..... *H04W 28/0268* (2013.01); *H04W 28/0263* (2013.01); *H04W 76/02* (2013.01); *H04W 28/24* (2013.01); *H04W 76/022* (2013.01); *H04W 84/12* (2013.01); *H04W 88/16* (2013.01)

(58) Field of Classification Search
CPC .......... H04W 28/0268; H04W 28/0263; H04W 76/02; H04W 84/12; H04W 88/16; H04W 76/022; H04W 28/24
See application file for complete search history.

(56) References Cited

U.S. PATENT DOCUMENTS 7,817,611 B2    10/2010 Ogura
2005/0281233 A1    12/2005 Parker et al.
(Continued)

FOREIGN PATENT DOCUMENTS

EP    1843530 A2    10/2007
KR    20070024191 A    3/2007
(Continued)

OTHER PUBLICATIONS

"3rd Generation Partnership Project; Technical Specification Group Services and System Aspects; Operator Policies for IP interface Selection (OPIIS); (Release 12)", 3GPP Standard; 3GPP TR 23.853, 3rd Generation Partnership Project (3GPP), Mobile Competence Centre; 650, Route Des Lucioles; F-06921 Sophia Antipoliscedex; France, vol. SA WG2, No. V0.5.0, XP050650358, Oct. 22, 2012, pp. 1-16.
(Continued)

*Primary Examiner* — Thai Nguyen
(74) *Attorney, Agent, or Firm* — Charles Chesney

(57) ABSTRACT

Systems, methods, and devices for accessing a service of a wireless carrier network through a wireless local area network (WLAN) are described. A method includes selecting one or more traffic management parameters associated with the WLAN based at least in part on one or more quality of service (QoS) parameters associated with the service of the wireless carrier network being accessed. The method further includes transmitting packets over the WLAN using the selected one or more traffic management parameters associated with the WLAN when a user equipment accesses the service of the wireless carrier network through the WLAN. The user equipment enforces the selected one or more traffic management parameters for communications to the wireless carrier network. An access point enforces the selected one or more traffic management parameters for communications to the user equipment.

24 Claims, 14 Drawing Sheets

(51) Int. Cl.
  *H04W 76/02* (2009.01)
  *H04W 84/12* (2009.01)
  *H04W 88/16* (2009.01)

(56) References Cited

U.S. PATENT DOCUMENTS

| | | | |
|---|---|---|---|
| 2010/0272013 A1* | 10/2010 | Horn | H04W 76/022 370/328 |
| 2011/0075675 A1 | 3/2011 | Koodli et al. | |
| 2011/0177811 A1 | 7/2011 | Heckman et al. | |
| 2011/0199987 A1 | 8/2011 | Rommer et al. | |
| 2011/0235546 A1 | 9/2011 | Horn et al. | |
| 2012/0057532 A1 | 3/2012 | Qi et al. | |
| 2012/0076121 A1 | 3/2012 | Choi et al. | |
| 2012/0099428 A1 | 4/2012 | Kamdar et al. | |
| 2012/0172036 A1 | 7/2012 | Bhalla | |
| 2012/0263041 A1 | 10/2012 | Giaretta et al. | |
| 2012/0294179 A1 | 11/2012 | Tafreshi | |
| 2012/0300750 A1 | 11/2012 | Chin et al. | |
| 2012/0307736 A1 | 12/2012 | Tang et al. | |
| 2013/0003698 A1 | 1/2013 | Olvera-Hernandez et al. | |
| 2013/0005332 A1 | 1/2013 | Sedlacek et al. | |
| 2013/0044709 A1 | 2/2013 | Adjakple et al. | |
| 2013/0083661 A1* | 4/2013 | Gupta | H04W 4/005 370/235 |
| 2013/0089076 A1 | 4/2013 | Olvera-Hernandez et al. | |
| 2013/0107783 A1 | 5/2013 | Shaw | |
| 2013/0121145 A1 | 5/2013 | Draznin et al. | |
| 2014/0036807 A1* | 2/2014 | Huang | H04W 76/021 370/329 |
| 2014/0078986 A1 | 3/2014 | Kaippallimalil et al. | |
| 2014/0079022 A1 | 3/2014 | Wang et al. | |
| 2014/0082697 A1 | 3/2014 | Watfa et al. | |
| 2014/0119178 A1 | 5/2014 | Zhao et al. | |
| 2014/0119292 A1 | 5/2014 | Zhao et al. | |
| 2014/0146783 A1 | 5/2014 | Kim et al. | |
| 2014/0192651 A1 | 7/2014 | Sun et al. | |

FOREIGN PATENT DOCUMENTS

| | | |
|---|---|---|
| WO | WO-2006000612 A1 | 1/2006 |
| WO | WO-2006137705 A1 | 12/2006 |
| WO | WO-2008137705 A1 | 11/2008 |
| WO | WO-2012030852 A1 | 3/2012 |

OTHER PUBLICATIONS

"3rd Generation Partnership Project; Technical Specification Group Services and System Aspects; Study on S2a Mobility based on GTP & WLAN access to EPC (SaMOG); Stage 2 (Release 11)", 3GPP Standard; 3GPP TR 23.852, 3rd Generation Partnership Project (3GPP), Mobile Competence Centre ; 650, Route Des Lucioles ; F-06921 Sophia-Antipolis Cedex; France, vol. SA WG2, No. V1.0.0, Dec. 12, 2011, pp. 1-40, XP050554477.

"3rd Generation Partnership Project; Technical Specification Group Services and System Aspects; Study on S2a Mobility based on GTP & WLAN access to EPC (SaMOG); Stage 2 (Release 12)", 3GPP Standard; 3GPP TR 23.852, 3rd Generation Partnership Project (3GPP), Mobile Competence Centre ; 650, Route Des Lucioles ; F-06921 Sophia-Antipoliscedex; France, vol. SA WG2, No. V1.2.0, Jul. 20, 2012, pp. 1-63, XP050648988, [retrieved on Jul. 20, 2012], p. 10-p. 38.

Alcatel-Lucent., "Discussion on Inter-System Routing Policies for MAPCON", 3GPP Draft; S2-110033 WAS 105442 ISRP for MAPCON and IFOM_V2, 3rd Generation Partnership Project (3GPP), Mobile Competence Centre; 650, Route Deslucioles; F-06921 Sophia-Antipolis Cedex ; France, vol. SA WG2, no. Elbonia; Jan. 17, 2011, XP050523356, Jan. 13, 2011, p. 1.

International Search Report and Written Opinion—PCT/US2013/066933—ISAEPO—Jan. 27, 2014.

Juniper Networks, "P-CR 23.852 v1.2.0 SaMOG Layer 2 Solution", 3GPP Draft; S2-122735_S2_92_FS_SAMOG_LAYER2_Solution, 3rd Generation Partnership Project (3GPP), Mobile Competence Centre ; 650, Route Des Lucioles ; F-06921 Sophia-Antipolis Cedex ; France, vol. SA WG2, no. Barcelona, Spain; XP050633268, Jul. 9, 2012-Jul. 13, 2012, Jul. 3, 2012, 6 pages.

\* cited by examiner

SYSTEMS AND METHODS FOR SAMOG BEARER MANAGEMENT

CROSS-REFERENCE TO RELATED APPLICATIONS

This application is a divisional application of Ser. No. 13/776,644 filed Feb. 25, 2013 and claims the benefit under 35 U.S.C. §119(e) U.S. Provisional Patent Application No. 61/719,244 entitled "Systems and methods for SaMOG bearer Management" filed on Oct. 26, 2012 the disclosure of which is expressly incorporated by reference herein in its entirety.

BACKGROUND

1. Field

The present application relates generally to wireless communications, and more specifically to systems, methods, and devices for bearer management for network elements in a wireless network.

2. Background

Wireless communication systems are widely deployed to provide various types of communication content such as voice and data. Typical wireless communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced, etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded high voice quality, reliable service, and low prices.

To accommodate increasing demand, evolution of core networks of wireless communication systems followed from evolution of radio interfaces. For example, System Architecture Evolution (SAE) lead by 3GPP aims to evolve a Global System for Mobile communications (GSM)/General Packet Radio Service (GPRS) core network. The resultant Evolved Packet Core (EPC) is a multi-access core network based on the Internet Protocol (IP) that enables operators to deploy and utilize one common packet-based core network with a plurality of radio access technologies. The EPC provides optimized mobility for mobile devices and enables efficient handovers between different radio access technologies (e.g., between LTE and High Rate Packet Data (HRPD)). In addition, standardized roaming interfaces enable operators to offer services to subscribers across a variety of access technologies.

As the number and types of devices capable of communicating data via the radio network to the core network increase, a need exists to perform such communications in an efficient manner.

SUMMARY

Various implementations of systems, methods and devices within the scope of the appended claims each have several aspects, no single one of which is solely responsible for the desirable attributes described herein. Without limiting the scope of the appended claims, some prominent features are described herein. Other features, aspects, and advantages will become apparent from the description, the drawings, and the claims.

One aspect of this disclosure provides a method for accessing a service of a wireless carrier network through a wireless local area network (WLAN). The method comprises selecting one or more traffic management parameters associated with the WLAN based at least in part on one or more quality of service (QoS) parameters associated with the service of the wireless carrier network being accessed. The method further comprises transmitting packets over the WLAN using the selected one or more traffic management parameters associated with the WLAN when a user equipment accesses the service of the wireless carrier network through the WLAN. The user equipment may enforce the selected one or more traffic management parameters for communications to the wireless carrier network. An access point may enforce the selected one or more traffic management parameters for communications to the user equipment over a radio link.

Another aspect of this disclosure provides an apparatus for accessing a service of a wireless carrier network through a WLAN. The apparatus comprises means for selecting one or more traffic management parameters associated with the WLAN based at least in part on one or more QoS parameters associated with the service of the wireless carrier network being accessed. The apparatus further comprises means for transmitting packets over the WLAN using the selected one or more traffic management parameters associated with the WLAN when a user equipment accesses the service of the wireless carrier network through the WLAN. The user equipment may enforce the selected one or more traffic management parameters for communications to the wireless carrier network. An access point may enforce the selected one or more traffic management parameters for communications to the user equipment over a radio link.

Another aspect of this disclosure provides a non-transitory computer-readable medium comprising code that, when executed, causes an apparatus to select one or more traffic management parameters associated with a WLAN based at least in part on one or more QoS parameters associated with a service of a wireless carrier network being accessed. The medium further comprises code that, when executed, causes an apparatus to transmit packets over the WLAN using the selected one or more traffic management parameters associated with the WLAN when a user equipment accesses the service of the wireless carrier network through the WLAN. The user equipment may enforce the selected one or more traffic management parameters for communications to the wireless carrier network. An access point may enforce the selected one or more traffic management parameters for communications to the user equipment over a radio link.

Another aspect of this disclosure provides an apparatus for accessing a service of a wireless carrier network through a WLAN. The apparatus comprises a processor configured to select one or more traffic management parameters associated with the WLAN based at least in part on one or more QoS parameters associated with the service of the wireless carrier network being accessed. The apparatus further comprises a transmitter configured to transmit packets over the WLAN using the selected one or more traffic management parameters associated with the WLAN when a user equipment accesses the service of the wireless carrier network through the WLAN. The user equipment may enforce the selected one or more traffic management parameters for communications to the wireless carrier network. An access point may enforce the selected one or more traffic management parameters for communications to the user equipment over a radio link.

Figure 1:
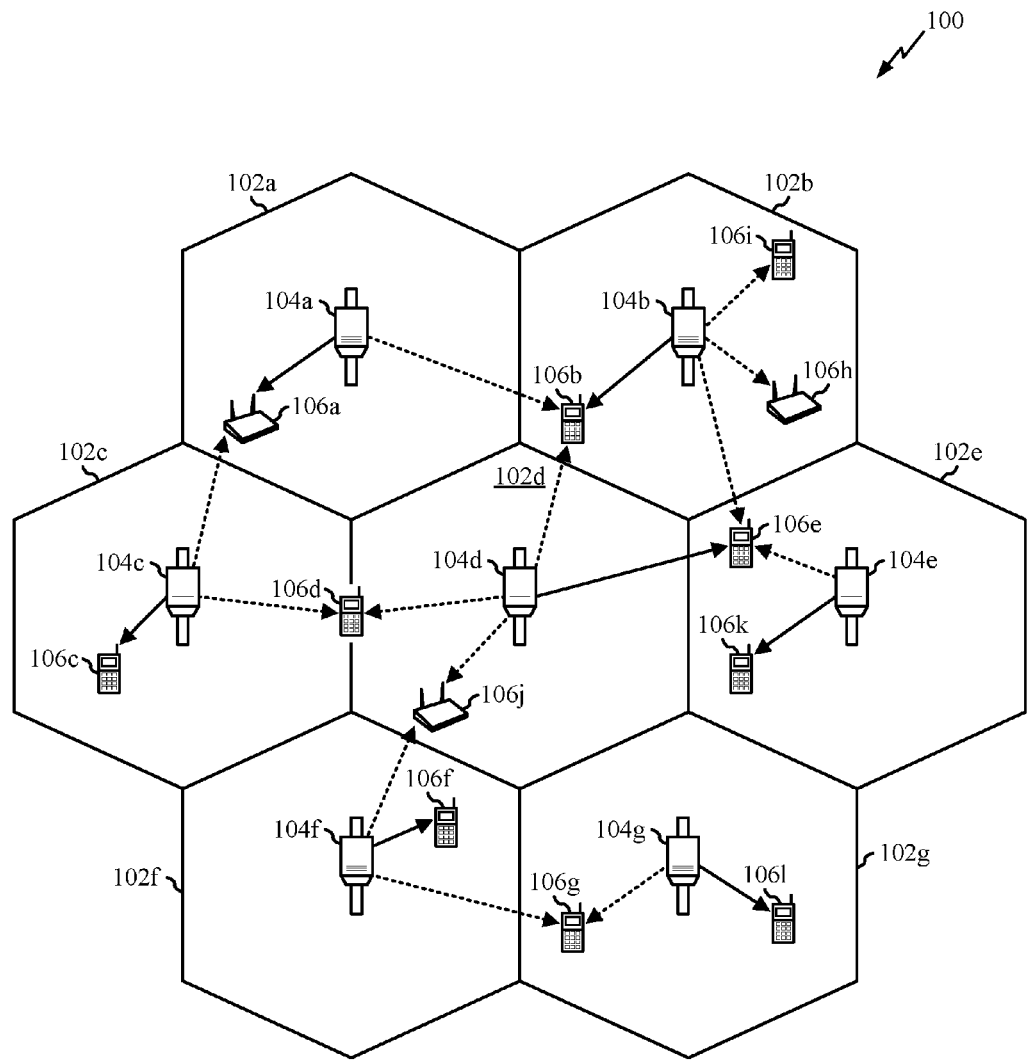
FIG. 1 illustrates an example of a wireless communication network in which aspects of the present disclosure may be employed.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary" is not necessarily to be construed as preferred or advantageous over other implementations. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the implementations shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2).

Furthermore, in the following description, for reasons of conciseness and clarity, terminology associated with the UMTS systems is used. It should be emphasized that the disclosed techniques may also be applicable to other technologies, such as technologies and the associated standards related to LTE Advanced, LTE, W-CDMA, TDMA, OFDMA, High Rate Packet Data (HRPD), Evolved High Rate Packet Data (eHRPD), Worldwide Interoperability for Microwave Access (WiMax), GSM, enhanced data rate for GSM evolution (EDGE), and so forth. Terminologies associated with different technologies can vary. For example, depending on the technology considered, the User Equipment (UE) used in UMTS can sometimes be called a mobile station, a user terminal, a subscriber unit, an access terminal, etc., to name just a few. Likewise, Node B used in UMTS can sometimes be called an evolved Node B (eNodeB), an access node, an access point, a base station (BS), HRPD base station (BTS), and so forth. It should be noted here that different terminologies apply to different technologies when applicable.

FIG. 1 illustrates an example of a wireless communication network or system 100 in which aspects of the present disclosure may be employed. The wireless communication network 100 may operate pursuant to a wireless standard, for example the LTE Advanced standard, LTE standard, WiMax standard, GSM standard, EDGE standard, 802.11 standard, WiFi Advanced-N standard, and so forth. The wireless communication system 100 may include an access point (AP) 104, which communicates with stations (STAs) 106.

An access point (AP) may comprise, be implemented as, or known as a Node B, Radio Network Controller (RNC), eNodeB, Base Station Controller (BSC), Base Transceiver Station (BTS), Base Station (BS), Transceiver Function (TF), Radio Router, Radio Transceiver, or some other terminology.

A station STA may comprise, be implemented as, or known as an access terminal (AT), a subscriber station, a subscriber unit, a mobile station, a remote station, a remote terminal, a user terminal, a user agent, a user device, user equipment (UE), or some other terminology. In some implementations an access terminal may comprise a cellular telephone, a cordless telephone, a Session Initiation Protocol (SIP) phone, a wireless local loop (WLL) station, a personal digital assistant (PDA), a smart meter or other machine-to-machine wireless communication device, a handheld device having wireless connection capability, or some other suitable processing device connected to a wireless modem. Accordingly, one or more aspects disclosed herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a wireless sensor device, a global positioning system device, or any other suitable device that is configured to communicate via a wireless medium.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with W-CDMA or CDMA techniques. If this is the case, the wireless communication system 100 may be referred to as a W-CDMA or CDMA system.

A communication link that facilitates transmission from the AP 104 to one or more of the STAs 106 may be referred to as a downlink (DL), and a communication link that facilitates transmission from one or more of the STAs 106 to the AP 104 may be referred to as an uplink (UL). Alternatively, a downlink may be referred to as a forward link or a forward channel, and an uplink may be referred to as a reverse link or a reverse channel.

The AP 104 may be configured as a base station and provide wireless communication coverage in a basic service area (BSA) 102. Depending on the technology considered, BSA can sometimes be called coverage area, cell, etc. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2A:
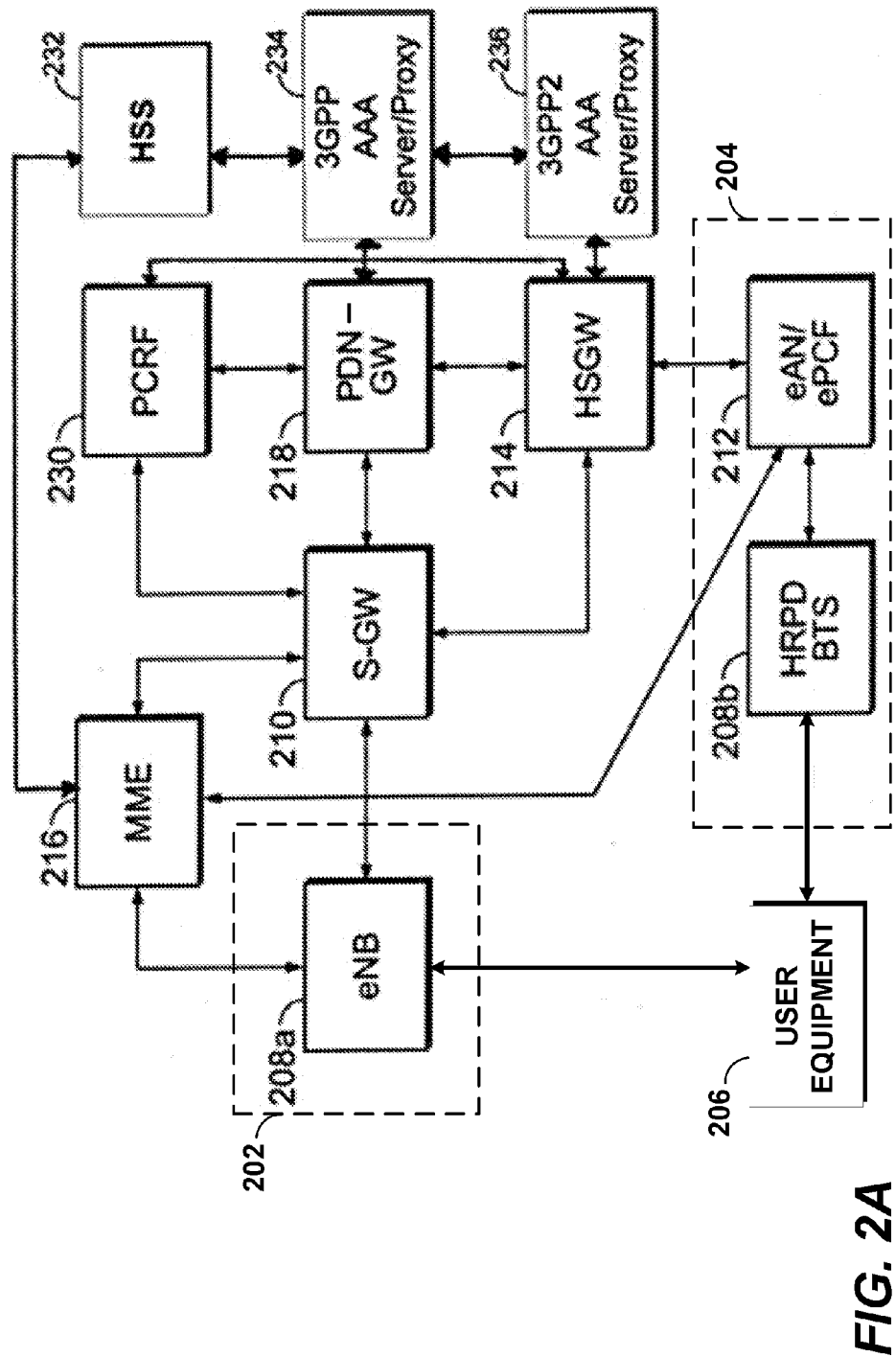
FIG. 2A illustrates an example of a functional block diagram of certain communication entities of the wireless communication network of FIG. 1.

FIG. 2A illustrates an example of a functional block diagram of certain communication entities of the wireless communication network of FIG. 1. The components shown in FIG. 2A illustrate a system in which a multimode or multiband device may communicate using multiple radio access technologies (RATs), for example an eHRPD network, an LTE network, etc. depending on the configuration of the network in the location in which the mobile device is currently operating. As FIG. 2A illustrates, the system 200 may include a radio access network (RAN) 202 that provides wireless radio communications between a UE 206 and an eNodeB 208a (e.g., a Node B, base station, access point, etc.) using LTE radio access technology. The system also depicts a RAN 204 which provides wireless radio communications between a UE 206 and a eHRPD base transceiver station (BTS) 208b (e.g., a Node B, base station, access point etc.) using eHRPD radio access technology. For simplicity of discussion, FIG. 2A depicts a UE 206 and one eNodeB 208a in a RAN 202 and one HRPD BTS 208b in another RAN 204; however, it is to be appreciated that each RAN 202 or 204 may include any number of UEs and/or eNodeBs/HRPD BTSs. In addition, it is to be appreciated that additional RANs may be included, such as UTRA, GSM, EDGE, and so forth.

In accordance with one aspect, the eNodeB 208a and HRPD BTS 208b may transmit information to a UE 206 over a forward link or downlink channel and a UE 206 can transmit information to the eNodeB 208a and HRPD BTS 209b over a reverse link or uplink channel. As shown, RANs can utilize any suitable type of radio access technology such as, but not limited to, LTE, LTE Advanced, HSPA, CDMA, HRPD, eHRPD, CDMA2000, GSM, GPRS, EDGE, UMTS, or the like.

The RANs 202 and 204, and specifically the eNodeB 208a and HRPD BTS 208b, can communicate with a core network (e.g., an evolved packet core (EPC) network) that enables charging (e.g., usage charges for services, etc.), security (e.g., ciphering and integrity protection), subscriber management, mobility management, bearer management, QoS handling, policy control of data flows, and/or interconnections with external networks. The RANs 202 and 204 and core network can communicate via an S1 interface, for instance. The core network can include a mobility management entity (MME) 216 that can be an end-point for control signaling from the RAN 202 or 204. The MME 216 can provide functions such as mobility management (e.g., tracking), authentication, and security. The MME 216 can communicate with the RANs 202 and 204 via the S1. The core network can also include a serving gateway (S-GW) 210 which is a user plane node that connects the core network to the LTE RAN 202. The core network may also include a HRPD serving gateway (HSGW) 214 which connects the core network to the eHRPD RAN 204. The eHRDP RAN 204 also includes an evolved access node (eAN) and an evolved packet control function (ePCF) entity 212 which manages the relay of packets between the HRPD BTS 208b and the HSGW 214.

Furthermore, the HSGW 214 and the S-GW 210 may communicate to facilitate interoperability between the eHRPD RAN 204 and the EPC. In another aspect, the MME 216 and S-GW 210 can be configured as a single node to provide a single end-point for user and control signaling originating from a RAN and/or terminating at a RAN. The network may also include a policy and charging rules function (PCRF) 230. The PCRF 230 may communicate with the S-GW 210, the HSGW 214, a PDN-GW 218 and the core network.

The core network can also include a packet data network gateway (PDN-GW) 218 that facilitates communications between the core network (and the RANs 202 and 204) and external networks. The PDN-GW 218 can provide packet filtering, QoS policing, charging, IP address allocation, and routing of traffic to external networks. In an example, the S-GW 210 and the PDN-GW 218 can communicate via an S5 interface. While illustrated as separate nodes in FIG. 2A, it is to be appreciated that the S-GW 210 and PDN-GW 218, for example, can be configured to operate as a single network node to reduce user plane nodes in core network. In one aspect, the core network may also include a 3GPP authentication, authorization and accounting (AAA) server/proxy 234 and a 3GPP2 AAA server/proxy 236 which may communicate with each other and further communicate with the PDN-GW 218 and the HSGW 214 respectfully. The core network may also include a home subscriber services (HSS) entity 232 which may communicate with the MME 216 and the 3GPP AAA server/proxy 234. In some implementations, the path between the PDN-GW 218 and the UE 206 may be referred to as a packet data network (PDN) connection. A PDN connection may be identified by one or more network (e.g., IP) addresses.

The core network can communicate with external networks via the PDN-GW 218. The external networks, not shown, can include networks such as, but not limited to, a public switched telephone network (PSTN), an IP multimedia subsystem (IMS), a packet switch stream (PSS), and/or an IP network. The IP network can be the Internet, a local area network, a wide area network, an intranet, or the like. It should be appreciated that configuration shown in FIG. 2A is an example of just one possible configuration and many other configurations and additional components may be used in accordance with various aspects and implementations described below.

Figure 2B:
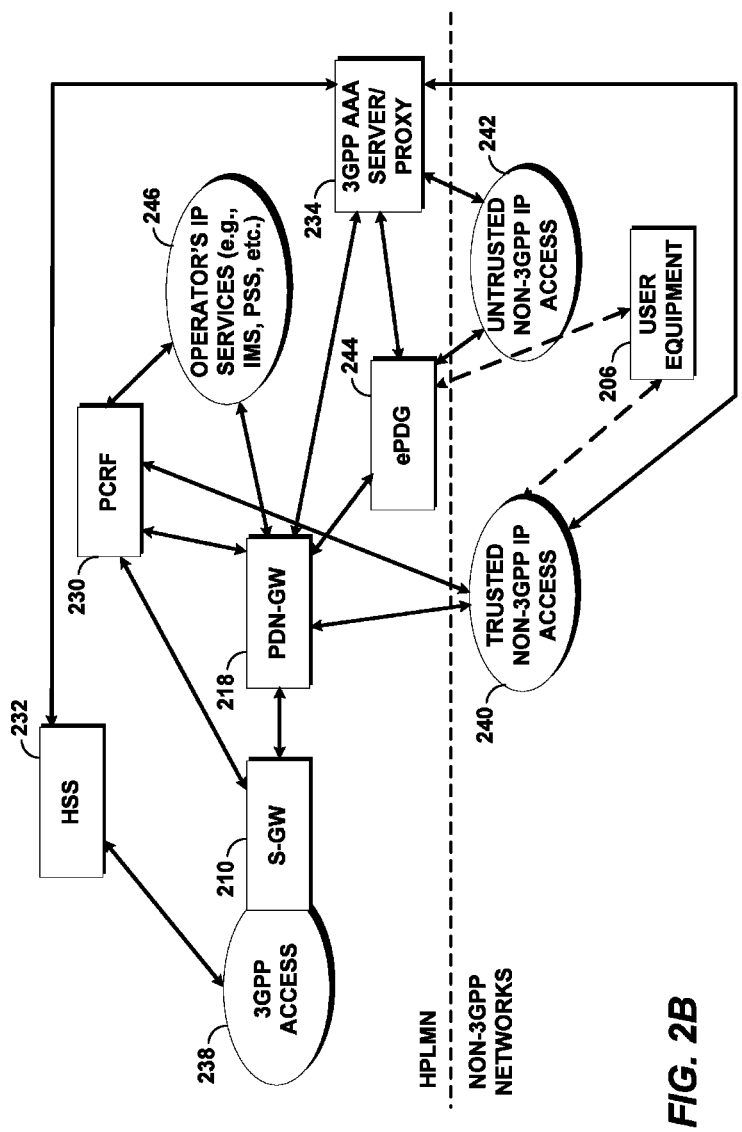
FIG. 2B illustrates another example of a functional block diagram of certain communication entities of the wireless communication network of FIG. 1.

FIG. 2B illustrates another example of a functional block diagram of certain communication entities of the wireless communication network of FIG. 1. The components shown in FIG. 2B illustrate a system in which a multimode or multiband device may access one or more services of a core network using a trusted or untrusted non-3GPP IP access network (e.g., a wireless local area network (WLAN)) that is in communication with the core network. As FIG. 2B illustrates, the system may include a home public land mobile network (HPLMN) and non-3GPP networks. The HPLMN may represent a core network. The non-3GPP networks may include any networks other than 3GPP networks that allow for communications between a STA (e.g., STA 106) and an AP (e.g., AP 104). As an example, a trusted non-3GPP network, such as trusted non-3GPP IP access network 240, may include a Wi-Fi hotspot operated by the carrier or operator. A non-trusted non-3GPP network, such as untrusted non-3GPP IP access network 242, may include a home Wi-Fi network, a work Wi-Fi network, or any other wireless access point that is not operated by the carrier or operator.

In some embodiments, the UE 206 may access the core network services via the trusted non-3GPP IP access network 240 or the untrusted non-3GPP IP access network 242. The trusted non-3GPP IP access network 240 or the untrusted non-3GPP IP access network 242 may transmit information to a UE 206 over a forward link or downlink channel and a UE 206 may transmit information to the trusted non-3GPP IP access network 240 or the untrusted non-3GPP IP access network 242 over a reverse link or uplink channel. In other embodiments, the UE 206 may access the core network services via a RAN, such as via the eNodeB 208a as illustrated in FIG. 2A. In further embodiments, the UE 206 may concurrently access a core network service via the trusted non-3GPP IP access network 240 or the untrusted non-3GPP IP access network 242 and another core network service via the eNodeB 208a.

In an embodiment, the trusted non-3GPP IP access network 240 and the PDN-GW 218 can communicate via an S2a interface (e.g., S2a-based mobility over GTP (SaMOG)). In some embodiments, the trusted non-3GPP IP access network 240 includes an AP that communicates with the UE 206 and a trusted wireless access gateway (TWAG) that communicates with the core network (e.g., with the PDN-GW 218). The AP and the TWAG may be in communication with each other (e.g., via a tunneled connection) to relay data between the UE 206 and the core network.

In an embodiment, the untrusted non-3GPP IP access network 242 and the PDN-GW 218 communicate via an evolved packet data gateway (ePDG) 244. Because the non-3GPP IP access network is untrusted, the ePDG 244 may be configured to secure a data transmission to and from the UE 206. The ePDG 244 and the PDN-GW 218 may communicate via an S2b interface.

In other embodiments, not shown, the UE 206 may communicate directly with the PDN-GW 218 via an S2c interface. The S2c interface may provide a tunneled connection between the UE 206 and the PDN-GW 218. The tunneled connection may be provided via the trusted non-3GPP IP access network 240 or via the untrusted non-3GPP IP access network 242 and the ePDG 244.

As described above with respect to FIG. 2A, the PDN-GW 218 may be in communication with internal and/or external networks. For example, the PDN-GW 218 may be in communication with the S-GW 210 and/or the operator's IP services 246. The S-GW 210 may provide access to the 3GPP access 238. The operator's IP services 246 may include networks such as, but not limited to, a public switched telephone network (PSTN), an IP multimedia subsystem (IMS), a packet switch stream (PSS), and/or an IP network. The IP network can be the Internet, a local area network, a wide area network, an intranet, or the like.

It should be appreciated that configuration shown in FIG. 2B is an example of just one possible configuration and many other configurations and additional components may be used in accordance with various aspects and implementations described below.

Figure 3:
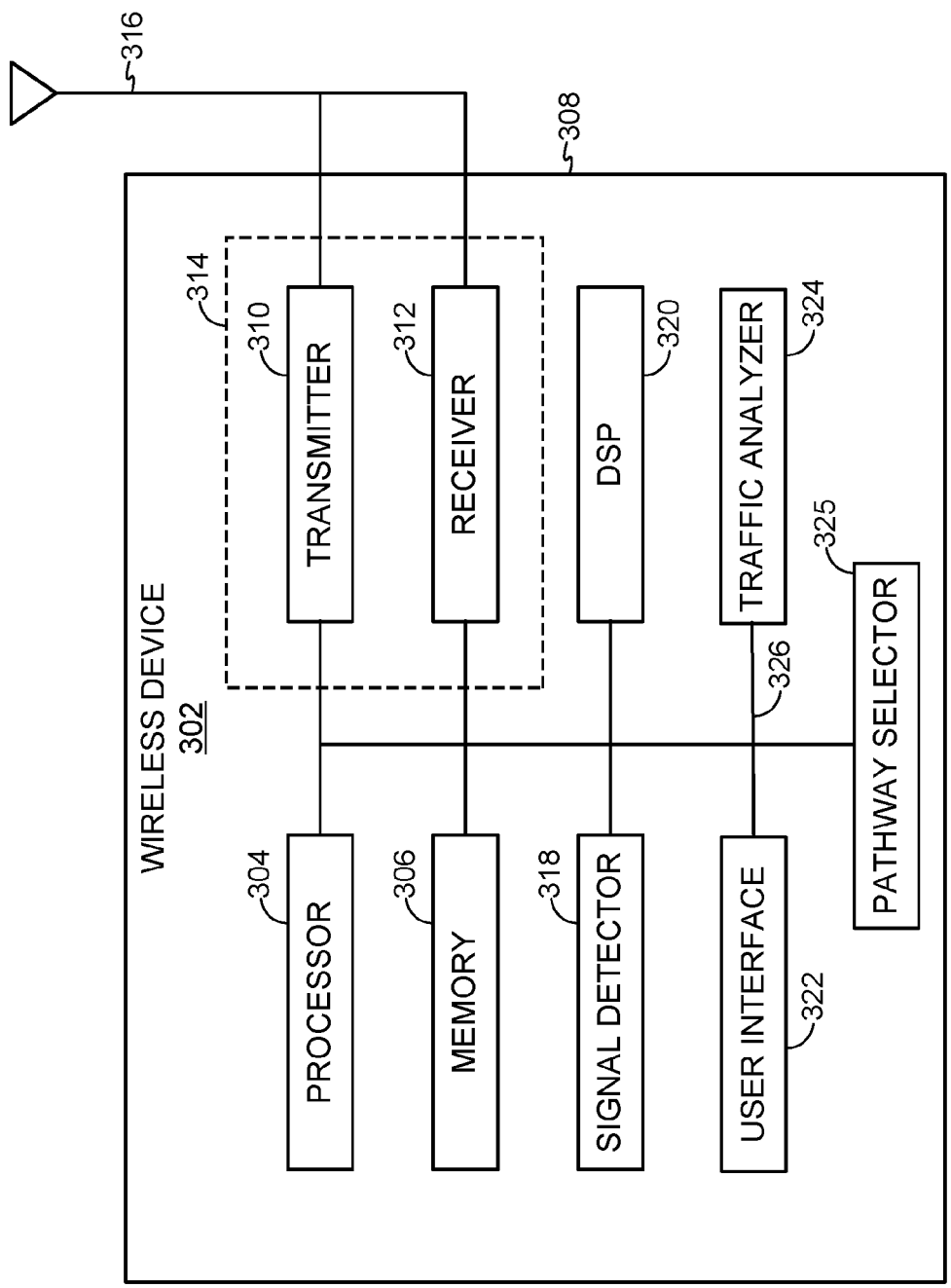
FIG. 3 illustrates an example of a functional block diagram of a wireless device that may be employed within the wireless communication network of FIG. 1.

FIG. 3 illustrates an example of a functional block diagram of a wireless device that may be employed within the wireless communication network of FIG. 1. The wireless device 302 is an example of a device that may be configured to implement the various methods described herein. For example, the wireless device 302 can comprise a STA, a UE, an AT, a subscriber station, a subscriber unit, a mobile station, a remote station, a remote terminal, a user terminal, a user agent, a user device, etc. As another example, the wireless device 302 may be multimode or multiband device, capable of operating using different radio access technologies (RATs), such as using LTE, LTE Advanced, HSPA, CDMA, HRPD, eHRPD, CDMA2000, GSM, GPRS, EDGE, UMTS, or the like.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The data in memory 306 may include configuration data. Configuration data may be preloaded into the memory 306. Configuration data may be obtained from a user of the wireless device 302 (e.g., through an interface 322, SIM card, download, over the air). The processor 304 may perform logical and arithmetic operations further based on the configuration data.

In some aspects, the processor 304 is configured to cause signals to be sent and receive signals from another device (e.g., AP 104, STA 106, etc.). The signals may include connection signals indicating the type of connection that may be used for a particular transmission for the device 302.

For example, in some implementations, the device 302 may be configured to transmit/receive small packets of data. Based on the transmission characteristic information, the processor 304 may cause transmission of a signal indicating the use of a common connection for transmitting such small packets. When the device 302 is implemented as an AP 104, the signal may be generated, for example, by a packet data serving node for one or more previously registered devices or a class of devices. The methods of AP 104 driven selection are described in further detail below. When the device 302 is implemented as an STA 106, the signal may be generated prior to or during the link control protocol requesting procedures. The methods of STA 106 driven selection are described in further detail below.

In some implementations such as when wireless device 302 is implemented as an AP, the processor 304 may be configured to enforce the access permissions. For example, if a device indicated as not permitted to access the AP attempts to acquire an unavailable data communication pathway, the processor 304 may cause the acquisition to fail.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that includes the transmitter 310 and/or the receiver 312 to allow transmission and reception of data between the wireless device 302 and a remote location. As alluded to above, the transmitter 310 may be configured to wirelessly transmit status information. Further, the receiver 312 may be configured to wirelessly receive user data. The transmitter 310 and receiver 312 may be combined into a transceiver 314. An antenna 316 may be attached to the housing 308 and electrically coupled to the transceiver 314. The wireless device 302 may also include (not shown) multiple transmitters, multiple receivers, multiple transceivers, and/or multiple antennas.

The wireless device 302 may also include a signal detector 318 that may be used to detect and quantify the level of signals received by the transceiver 314. The signal detector 318 may detect such signals as total energy, energy per subcarrier per symbol, power spectral density, and other signals. The wireless device 302 may also include a digital signal processor (DSP) 320 for use in processing signals. The DSP 320 may be configured to generate a packet for transmission and/or process a received packet.

In some aspects, the wireless device 302 may further comprise a user interface 322. The user interface 322 may comprise a keypad, a microphone, a speaker, and/or a display. The user interface 322 may include any element or component that conveys information to a user of the wireless device 302 and/or receives input from the user.

The wireless device 302 may include a traffic analyzer 324. The traffic analyzer 324 may be configured to generate one or more values indicating a characteristic of data to be transmitted. For example, the wireless device may be a smart utility meter. A meter reading may be generated, for example, by the processor 304. Prior to transmission, the traffic analyzer 324 may determine a characteristic of the meter reading to be transmitted. The traffic analyzer 324 may generate a value indicating the quantity of data to be transmitted. For example, the traffic analyzer 324 may determine the number of bytes to be transmitted. The traffic analyzer 324 may be configured to determine how frequently the meter readings are transmitted. For example the traffic analyzer 324 may track a history of meter readings over time. The traffic analyzer 324 may then generate a value indicating how often data is transmitted. The traffic analyzer 324 may be configured to detect a type of data to be transmitted. For example, a smart meter reading may include a few bites of integer data. In other applications, the data to be transmitted may be audio, video, or multimedia data. The type of data may also indicate the importance of the information. For example, in a cellular device which is included in an automobile, routine maintenance information may be considered low importance while an indication of a traffic accident (E.G., airbag deployed) may be more critical. The traffic analyzer 324 may be configured to identify an application generating the data to be transmitted. A wireless device 302 may include one or more applications which may generate and or receive data. By identifying the application associated with the data, the traffic may be analyzed.

The values generated by the traffic analyzer 324 may be stored in the memory 306. The values may be accessed by a pathway selector 325. The pathway selector may be configured to select a communication pathway for the data to be transmitted. In some implementations, the pathway selector 325 may be configured to select between a common data communication pathway and a dedicated data communication pathway. The pathway selector 325 may be configured to compare one or more characteristics provided by the traffic analyzer 324 to select the appropriate data communication pathway. For example, the pathway selector 325 may be configured to select the common data communication pathway if the number of bytes to be transmitted is less than a predetermined threshold. The threshold may correspond to a relatively small data transmission. The threshold may be provided by the network operator. For example, the threshold may be provisioned over the air via signaling with the network. The threshold may be stored in the memory 306 or dynamically determined based on one or more characteristics of the device, the network, or the like. In some implementations, the pathway selector 325 may be configured to compare a characteristic of the data to a range. If the characteristic value falls within the range, an appropriate selection may be made. As with the threshold, the range may be provisioned in a variety of ways.

The pathway selector 325 may be configured to select a data communication pathway by signaling via the network. The pathway selector 325 may be configured to select a data communication pathway from an STA. The pathway selector 325 may be configured to select a data communication pathway from a non-STA network component such as an access point, a RAN, or a PDSN. The pathway selector 325 may be configured to select a data communication pathway from a STA to an external network accessible by the STA. In some embodiments, the external network may be specified by an access point name (APN). The pathway selector 325 may be configured to select a data communication pathway through one or more of the call flows described in further detail below.

The various components of the wireless device 202 may be coupled together by a bus system 326. The bus system 326 may include a data bus, for example, as well as a power bus, a control signal bus, and a status signal bus in addition to the data bus. Those of skill in the art will appreciate the components of the wireless device 302 may be coupled together or accept or provide inputs to each other using some other mechanism.

Although a number of separate components are illustrated in FIG. 3, those of skill in the art will recognize that one or more of the components may be combined or commonly implemented. For example, the processor 304 may be used to implement not only the functionality described above with respect to the processor 304, but also to implement the functionality described above with respect to the signal detector 318 and/or the DSP 320. Further, each of the components illustrated in FIG. 3 may be implemented using a plurality of separate elements. For example, the processor 304 and the memory 306 may be embodied on a single chip.

The processor 304 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

In this specification and the appended claims, it should be clear that the terms "circuit" and "circuitry" are construed as a structural terms and not as functional terms. For example, circuitry can be an aggregate of circuit components, such as a multiplicity of integrated circuit components, in the form of processing and/or memory cells, units, blocks, and the like, such as shown and described in FIG. 3. One or more of the functional blocks and/or one or more combinations of the functional blocks described with respect to the wireless device 302 may also be implemented as a combination of computing devices, e.g., a combination of a DSP and a microprocessor, a plurality of microprocessors, one or more microprocessor in conjunction with a DSP communication, or any other such configuration.

In some wireless cellular systems, capacity and/or bandwidth may be limited. For example, in densely populated areas or when a large number of subscribers congregate in a single area, the number of subscribers and/or the amount of data being transmitted over the system may cause dropped calls, slower transmission rates, and/or a poorer user experience. Accordingly, operators may offload some or all of the data to a wireless local area network (WLAN) to extend the capacity of the wireless cellular system and provide a better user experience. This process may be called WLAN offload.

In an embodiment, the operator may use the WLAN to access the core network (e.g., the EPC network) and maintain connectivity when switching between a WLAN and a RAN (e.g., a wireless wide area network (WWAN)). In some cases, the operator may support multiple PDN connections over WLAN and WWAN, which is known as multiple access PDN connectivity (MAPCON).

In some embodiments, as described above with respect to FIG. 2B, a UE connects with a WLAN, which connects with the core network. Generally, the core network provides a virtual connection between a UE and a PDN-GW before any traffic is transmitted between them. The virtual connection may be called an evolved packet system (EPS) bearer.

In some aspects, the EPS bearer provides a transport service with specific quality of service (QoS) attributes. The EPS bearer may include a QoS class index (QCI), which describes the type of service using the virtual connection (e.g., voice, video, signaling, etc.), a guaranteed bitrate (GBR) for the traffic that flows through the connection, a maximum bitrate (MBR) for the traffic that flows through the connection, and/or a filter specification that indicates the traffic flows (e.g., in terms of IP addresses, protocols, port numbers, etc.) supported by the virtual connection between the UE and the PDN-GW. In an embodiment, the QCI may further include other QoS attributes, such as maximum delay, residual error rate, and the like.

In an embodiment, a procedure used to establish a bearer is called bearer activation. Bearer activation may be initiated by the UE, the AP, the trusted or untrusted wireless access gateway, the PDN-GW, and/or any device in the core network.

While bearer establishment and modification procedures have been defined for RAN or WWAN connections, bearer establishment and modification procedures have not been defined when a UE interfaces with the PDN-GW via a trusted or untrusted non-3GPP IP access network (e.g., during WLAN offload). Thus, the UE may be unaware of the specific QoS attributes defined by the accessed service. Packets between the trusted or untrusted non-3GPP IP access network and the PDN-GW may be transmitted according to the appropriate QoS parameters, but packets between the UE and the trusted or untrusted non-3GPP IP access network may not be transmitted according to the appropriate QoS parameters.

Figure 4:
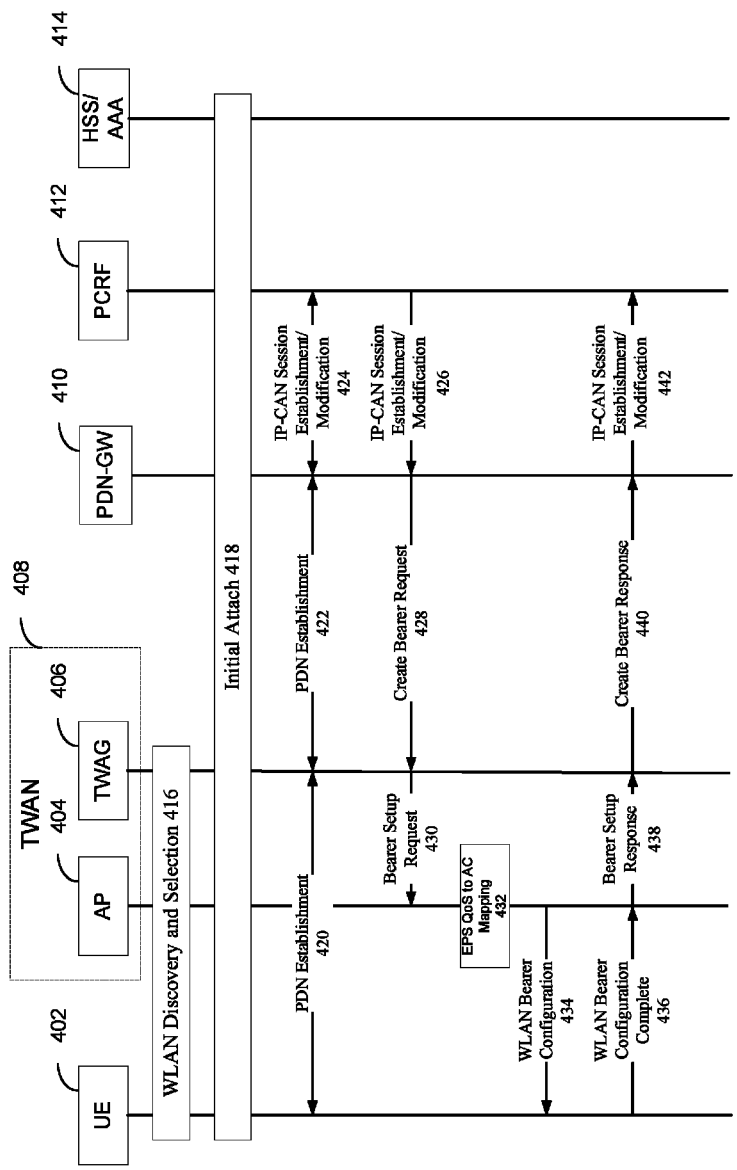
FIG. 4 illustrates an exemplary call flow diagram of a bearer activation procedure.

FIG. 4 illustrates an exemplary call flow diagram of a bearer activation procedure. The call flow diagram shown in FIG. 4 includes some of the entities which may be included in a wireless communication system according to the described systems and methods. The entities shown in FIG. 4 include a UE 402, an AP 404, a trusted wireless access gateway (TWAG) 406, a PDN-GW 410, a PCRF 412, and an HSS/AAA 414. In some embodiments, not shown, the TWAG 406 may be replaced by an untrusted wireless access gateway. The procedures as described herein may be similar if the untrusted wireless access gateway replaces the TWAG 406.

The AP 404 and the TWAG 406 may together represent a trusted wireless area network (TWAN) 408. As described above, the AP 404 may communicate directly with the UE 402. The TWAG 406 may communicate directly with the core network (e.g., PDN-GW 410). The AP 404 and the TWAG 406 may be in communication with each other via a connection, such as a tunneled connection. In other embodiments, the AP 404 may communicate directly with the core network and/or the TWAG 406 may communicate directly with the UE 402.

Transmissions 416 represent the signals that may be transmitted to and from the UE 402, the AP 404, and/or the TWAG 406 for WLAN discovery and selection. For example, the signals of transmissions 416 may be transmitted so that the UE 402 can select an AP. Transmissions 418 represent the signals that may be transmitted to and from any or all of the entities shown in FIG. 4 for the initial attach of the UE 402 to the core network. In an embodiment, the transmissions 418 may also include signals transmitted between the entities for extensible authentication protocol (EAP) authentication.

Transmissions 420 represent the signal that may be transmitted to and from the UE 402 and the TWAG 406 to establish a PDN connection. It should be appreciated that the signals may be transmitted directly to and from the UE 402 and the TWAG 406, or via another entity, such as the AP 404. The UE 402 may attempt to establish a PDN connection to access one or more services provided available through the core network (e.g., the operator's IP services). Once the appropriate signals have been transmitted to and from the UE 402 and the TWAG 406, transmissions 422 may be sent to and from the TWAG 406 and the PDN-GW 410 to continue establishing the PDN connection.

Once transmissions 422 are complete, transmissions 424 may be transmitted to and from the PDN-GW 410 and the PCRF 412 for IP connectivity access network (IP-CAN) session establishment and/or modification. Establishing an IP-CAN session may provide IP connectivity within the core network and more particularly for a service to be provided by the core network. For example, the establishment of an IP-CAN session may create an association between the UE 402 (e.g., represented as an IP address) and a PDN (e.g., represented as an access point name (APN)).

Once the IP-CAN session has been established and/or modified, signal 426 may be transmitted from the PCRF 412 to the PDN-GW 410 indicating that the session has been established and/or modified. The signal 426 may include the QoS attributes of the service that the UE will access and/or information that can be used to generate the appropriate QoS attributes. The PDN-GW 410 may be configured to generate a create bearer request, which includes the QoS attributes for the service available through the core network and that will be accessed by the UE 402. The create bearer request may be transmitted to the TWAG 406, as illustrated by signal 428.

The TWAG 406 may receive the signal 428 and forward the contents of the signal 428 to the AP 404 as a bearer setup request signal 430. For example, the signal 430 may include the QoS attributes for the service available through the core network. In further embodiments, the signal 430 may include a traffic flow template (TFT). As discussed below, the TFT may be used to filter packets to be transmitted. The bearer setup request signal 430 may be transmitted to establish the bearer procedures for WLAN communications.

In an embodiment, the AP 404 maps one or more of the QoS attributes to one or more traffic management parameters supported by a WLAN at block 432. As an example, QoS over WLAN can be supported using Enhanced Distributed Channel Access (EDCA), which is defined in the IEEE 802.11e protocol. EDCA may define traffic priorities called access categories. For example, access categories may define a minimum contention window (CW) value, a maximum CW value, and/or an arbitration inter-frame space (AIFS) for accessing a medium. Traffic with higher priority may have a shorter CW and a shorter AIFS. Accordingly, the AP 404 may map one or more of the QoS attributes to one or more access categories.

In an embodiment, one or more access categories may be transmitted to the UE 402 in a WLAN bearer configuration signal 434. In some embodiments, the signal 434 may also include the TFT. During subsequent communications, the UE 402 may filter packets based on the TFT and access the medium based on the one or more access categories. Likewise, the AP 404 may filter packets based on the TFT and access the medium based on the one or more access categories.

The UE 402 may acknowledge that it has received the signal 434 via a WLAN bearer configuration complete signal 436. Once the AP 404 receives signal 436, the AP 404 may transmit an acknowledgement to the TWAG 406 indicating that the bearer setup is complete via the bearer setup response signal 438. Likewise, the TWAG 406 may transmit the create bearer response signal 440 to the PDN-GW 410 acknowledging that the bearer has been established and the PDN-GW 410 may transmit the IP-CAN session establishment/modification signal 442 acknowledging that the IP-CAN session has been established or modified.

Figure 5:
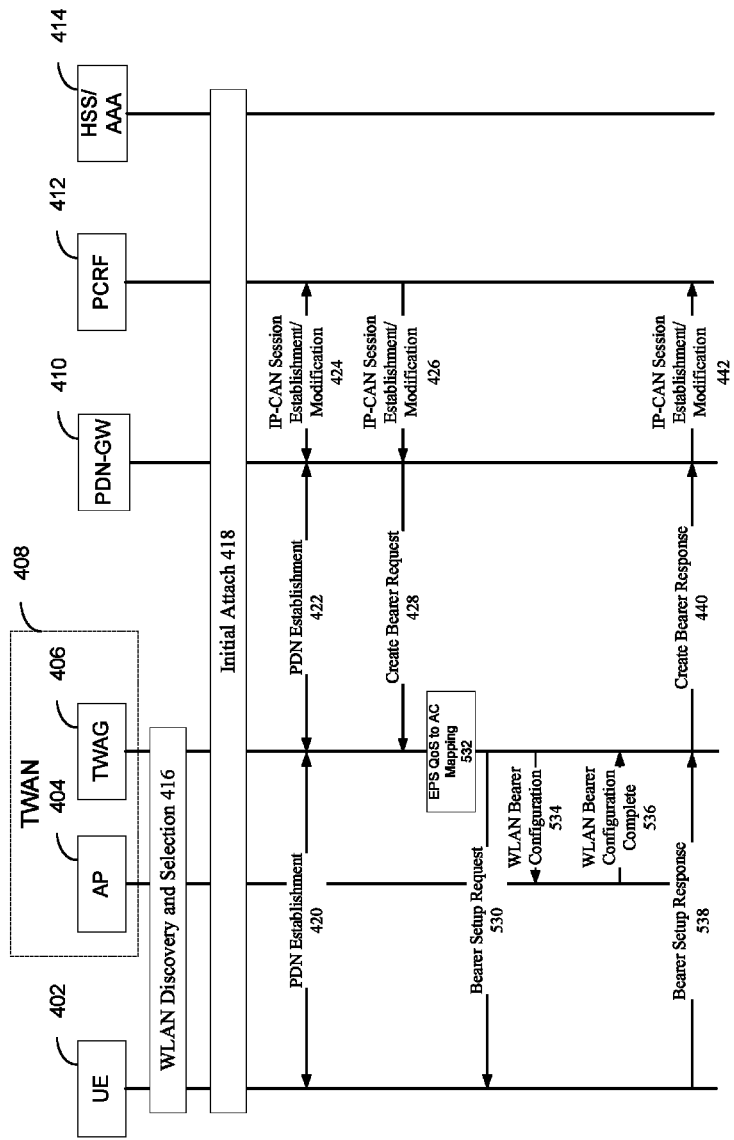
FIG. 5 illustrates another exemplary call flow diagram of a bearer activation procedure.

FIG. 5 illustrates another exemplary call flow diagram of a bearer activation procedure. The entities shown in FIG. 5 are similar to those shown in FIG. 4. The procedure illustrated in FIG. 5 is also similar to the procedure illustrated in FIG. 4. However, as illustrated in FIG. 5, the TWAG 406, not the AP 404, is configured to map one or more QoS attributes to one or more access categories.

As described above, the TWAG 406 may receive the signal 428, which includes a create bearer request. Upon receiving the signal 428, the TWAG 406 may map one or more QoS attributes to one or more access categories defined by EDCA at block 532. Once complete, the TWAG 406 may transmit a bearer setup request signal 530 to the UE 402. The bearer setup request signal 530 may include one or more access categories and the TFT. As described above, the UE 402 may filter packets based on the TFT and access the medium based on the one or more access categories.

In an embodiment, the TWAG 406 may also transmit a WLAN bearer configuration signal 534 to the AP 404. The WLAN bearer configuration signal 534 may include one or more access categories and the TFT. As described above, the AP 404 may filter packets based on the TFT and access the medium based on the one or more access categories.

In response to the transmission of the WLAN bearer configuration signal 534, the TWAG 406 may receive an acknowledgment from the AP 404 in the form of WLAN bearer configuration complete signal 536. Likewise, in response to the transmission of the bearer setup request signal 530, the TWAG 406 may receive an acknowledgment from the UE 402 in the form of bearer setup response 538. While FIG. 5 illustrates the TWAG 406 receiving signal 538 after signal 536, the signals may be received in any order. Furthermore, while FIG. 5 illustrates the TWAG 406 transmitting signal 534 after signal 530, the signals may be transmitted in any order.

In an embodiment, once the TWAG 406 receives the signal 536 and/or the signal 538, the TWAG 406 may transmit the create bearer response signal 440, as described above with respect to FIG. 4. The PDN-GW 410 may receive the signal 440 and transmit the IP-CAN establishment/modification signal 442 to the PCRF 412.

Figure 6:
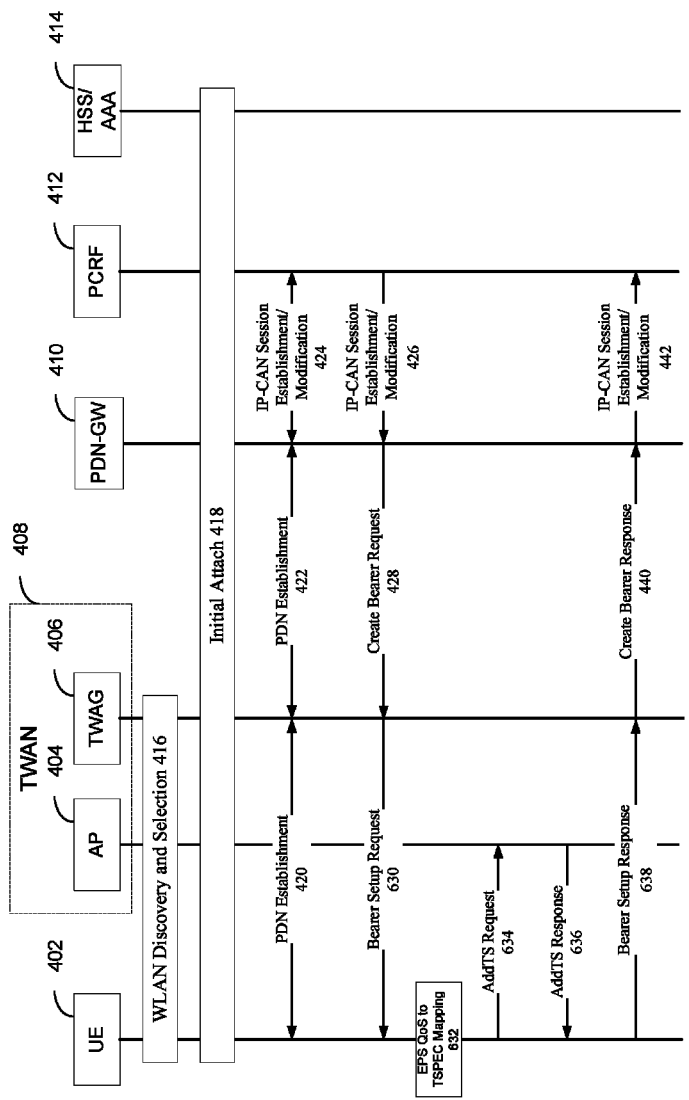
FIG. 6 illustrates another exemplary call flow diagram of a bearer activation procedure.

FIG. 6 illustrates another exemplary call flow diagram of a bearer activation procedure. The entities shown in FIG. 6 are similar to those shown in FIGS. 4 and 5. The procedure illustrated in FIG. 6 is also similar to the procedures illustrated in FIGS. 4 and 5. However, as illustrated in FIG. 6, the UE 402, not the AP 404 or the TWAG 406, is configured to perform the appropriate mapping.

As described above, the TWAG 406 may receive the signal 428, which includes a create bearer request. Upon receiving the signal 428, the TWAG 406 may transmit a bearer setup request signal 630 to the UE 402. The bearer setup request signal 630 may be similar to the bearer setup request signal 430. For example, the signal 630 may include the QoS attributes for the service available through the core network and/or a TFT.

In some embodiments, if the WLAN supports the use of traffic specification (TSPEC) admission control, the UE 402 may perform the mapping. The TSPEC admission control procedure may be defined in the IEEE 802.11e protocol. Under the TSPEC admission control procedure, the UE 402 requests medium time from the AP 404 for a traffic stream by providing traffic management parameters (e.g., a TSPEC). The TSPEC may include a medium access control service data unit (MSDU) size, a minimum data rate, a mean data rate, a peak data rate, a burst size, and/or similar data. As illustrated in FIG. 6 at block 632, the UE 402 may map one or more QoS attributes to a TSPEC.

Once complete, the UE 402 may transmit an AddTS request signal 634 to the AP 404. The signal 634 may be a request by the UE 402 to reserve resources for the bearer (e.g., reserve resources for a traffic stream defined by the TSPEC). The AP 404 may respond with an AddTS response signal 636, which may indicate whether the request to reserve resources for the bearer has been accepted or denied.

In an embodiment, the UE 402 transmits a bearer setup response signal 638 to the TWAG 406. The UE 402 may transmit the signal 638 in response to receiving the signal 636. Once the TWAG 406 receives the signal 638, the TWAG 406 may transmit the create bearer response signal 440, as described above with respect to FIG. 4. The PDN-GW 410 may receive the signal 440 and transmit the IP-CAN establishment/modification signal 442 to the PCRF 412.

In some embodiments, a UE, such as the UE 206, may have a PDN connection via a non-3GPP IP access network (e.g., over WLAN). The UE 206 may have a PDN connection to an external network via the core network. An access point name (APN) may identify an external network and determine how the UE 206 communicates with the external network via the core network. For example, the APN may determine an IP address, security protocols, network connections, and the like. As an example, the UE 206 may have a PDN connection to a first APN over WLAN.

As described above, the operator or carrier may support multiple PDN connections, including concurrent PDN connections over WLAN and WWAN (e.g., a RAN that uses any type of RAT, such as LTE, LTE Advanced, etc.). This is known as multiple access PDN connectivity (MAPCON). Thus, if the UE 206 currently has a PDN connection over WLAN, the UE 206 may add another PDN connection over WWAN. The operator or carrier may identify a particular APN to use when the UE 206 attaches to the core network (e.g., when the UE 206 performs LTE attach). Conflicts may occur, however, if a policy of the UE 206 (e.g., a policy of an application that is executed on the UE 206) indicates that the PDN connection to the first APN stays over WLAN, but the operator or carrier indicates that the PDN connection to the first APN must be over WWAN.

Figure 7:
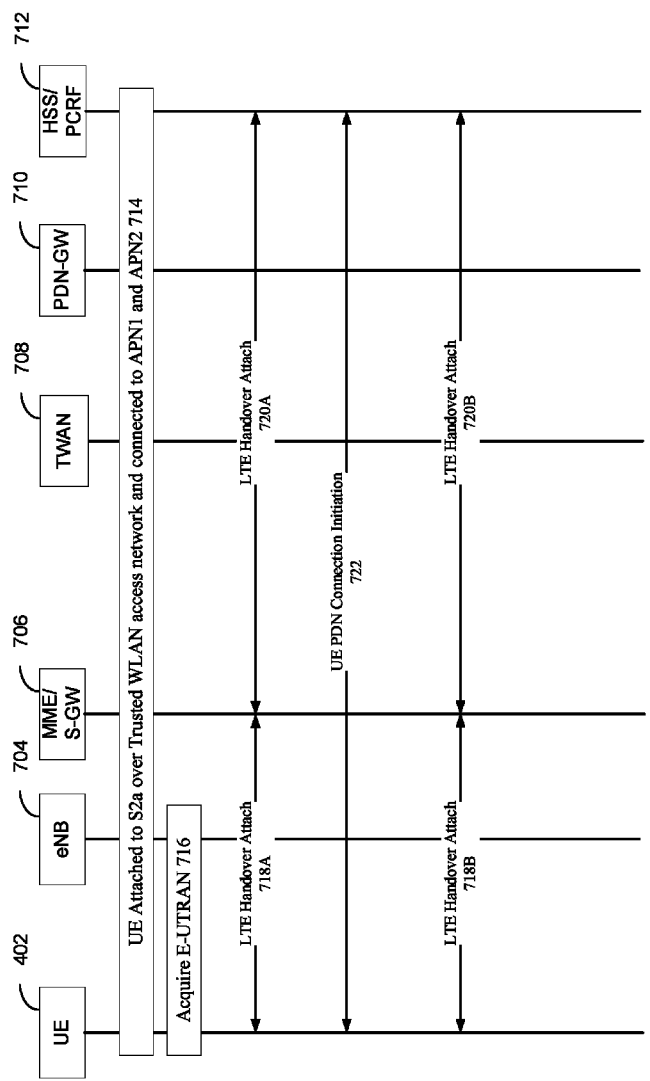
FIG. 7 illustrates an exemplary call flow diagram that resolves a MAPCON conflict.

FIG. 7 illustrates an exemplary call flow diagram that resolves the MAPCON conflict described above. The call flow diagram shown in FIG. 7 includes some of the entities which may be included in a wireless communication system according to the described systems and methods. The entities shown in FIG. 7 include a UE 402, an eNodeB 704, a MME/S-GW 706, a TWAN 708, a PDN-GW 710, and an HSS/PCRF 712. In some embodiments, not shown, additional PDN-GWs may be included in the wireless communication system. Each PDN-GW may indicate the existence of a different PDN connection. A single PDN-GW may also handle multiple PDN connections.

Transmissions 714 represent the signals that may be transmitted to and from the UE 402, the TWAN 708, the one or more PDN-GWs 710, and/or the HSS/PCRF 712. The signals of transmissions 714 may be sent to allow the UE 402 to attach to a trusted WLAN access network, such as the TWAN 708, via an S2a interface. The signals of transmissions 714 may initiate a PDN connection to a first APN (e.g., APN1) and a second APN (e.g., APN2).

Transmissions 716 represent the signals that may be transmitted to and from the UE 402 and the eNodeB 704 to acquire an evolved universal terrestrial radio access network (E-UTRAN). The E-UTRAN may be a type of RAN that provides an interface between a UE and an eNodeB. The UE 402 may acquire the E-UTRAN to initiate a PDN connection over WWAN (e.g., to initiate the LTE attach procedure).

In an embodiment, the UE 402 may determine or the operator or carrier may provide information that the UE 402 should use APN1 to attach to the E-UTRAN. On the other hand, the UE 402 has a PDN connection to APN1 over WLAN, and the UE 402 may determine or the operator or carrier may provide information that the UE 402 should connect to APN1 via WLAN. Thus, a conflict may arise. The conflict may be resolved in one of several ways.

In a first embodiment for resolving the conflict, the UE 402 may not indicate an APN during the attach procedure. Instead, the UE 402 may allow the core network to determine the APN that the UE 402 should connect to during the attach procedure. The UE 402 may then connect to the APN determined by the core network over WWAN. After the UE 402 completes the attach procedure, the UE 402 may transmit a request to connect to the APN requested by an application of the UE 402 over WWAN.

An example of the first embodiment is illustrated by signals 718A, 720A, and 722. In an embodiment, the UE 402 and the MME/S-GW 706 may communicate via the LTE handover attach signal 718A. The signal 718A may not include an indication of an APN to use during the attach procedure (e.g., signal 718A may include a null APN parameter). The MME/S-GW 706 and the HSS/PCRF 712 may communicate via the LTE handover attach signal 720A. The signal 720A may include data similar to the data included in signal 718A.

After attaching to E-UTRAN, the UE 402 may initiate the establishment of a PDN connection to an APN that is not the APN the network identifies as the attach APN via signal 722. This PDN connection may be over WWAN.

In a second embodiment for resolving the conflict, the policy of the UE 402 may determine which APN should be used to attach to the core network. The UE 402 may then connect to the determined APN over WWAN. In some embodiments, this embodiment may require the core network to allow some or all APNs to be used during the attach procedure.

An example of the second embodiment is illustrated by signals 718B and 720B. In an embodiment, the UE 402 and the MME/S-GW 706 may communicate via the LTE attach signal 718B. The signal 718B may include an indication of an APN that will be used during the attach procedure. The APN may be determined by the UE 402. The MME/S-GW 706 and the HSS/PCRF 712 may communicate via the LTE handover attach signal 720B. The signal 720B may include data similar to the data included in signal 718B.

Figure 8:
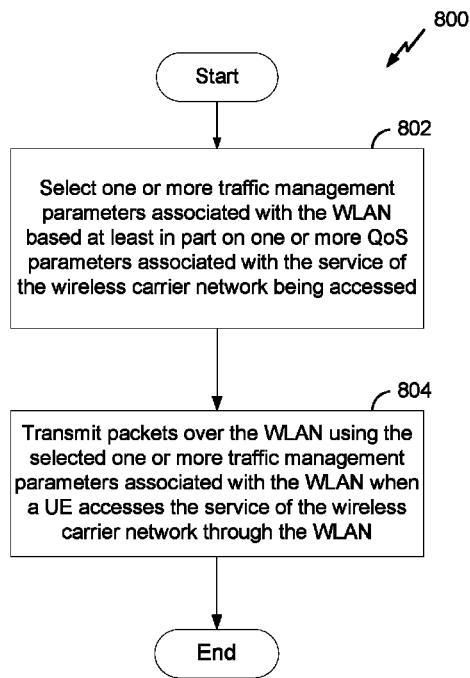
FIG. 8 illustrates a process for accessing a service of a carrier network through a wireless local area network (WLAN).

FIG. 8 is a flowchart of a process 800 for accessing a service of a wireless carrier network through a wireless local area network (WLAN). At block 802, the process 800 selects one or more traffic management parameters associated with the WLAN based at least in part on one or more quality of service (QoS) parameters associated with the service of the wireless carrier network being accessed. In an embodiment, the one or more traffic management parameters may include one or more access categories. For example, the QoS parameters associated with the service of the carrier network may be mapped to one or more of the access categories. In some embodiments, an AP, such as the AP 404, may perform the mapping. In other embodiments, a TWAG, such as the TWAG 406, may perform the mapping. In another embodiment, the one or more traffic management parameters may include a traffic specification (TSPEC). For example, the QoS parameters associated with the service of the wireless carrier network may be mapped to the TSPEC by a UE, such as the UE 402.

At block 804, the process 800 transmits packets over the WLAN using the selected one or more traffic management parameters associated with the WLAN when a UE accesses the service of the carrier network through the WLAN. In an embodiment, the UE enforces the selected one or more traffic management parameters for communications to the wireless carrier network. An AP may enforce the selected one or more traffic management parameters for communications to the UE over a radio link.

Figure 9:
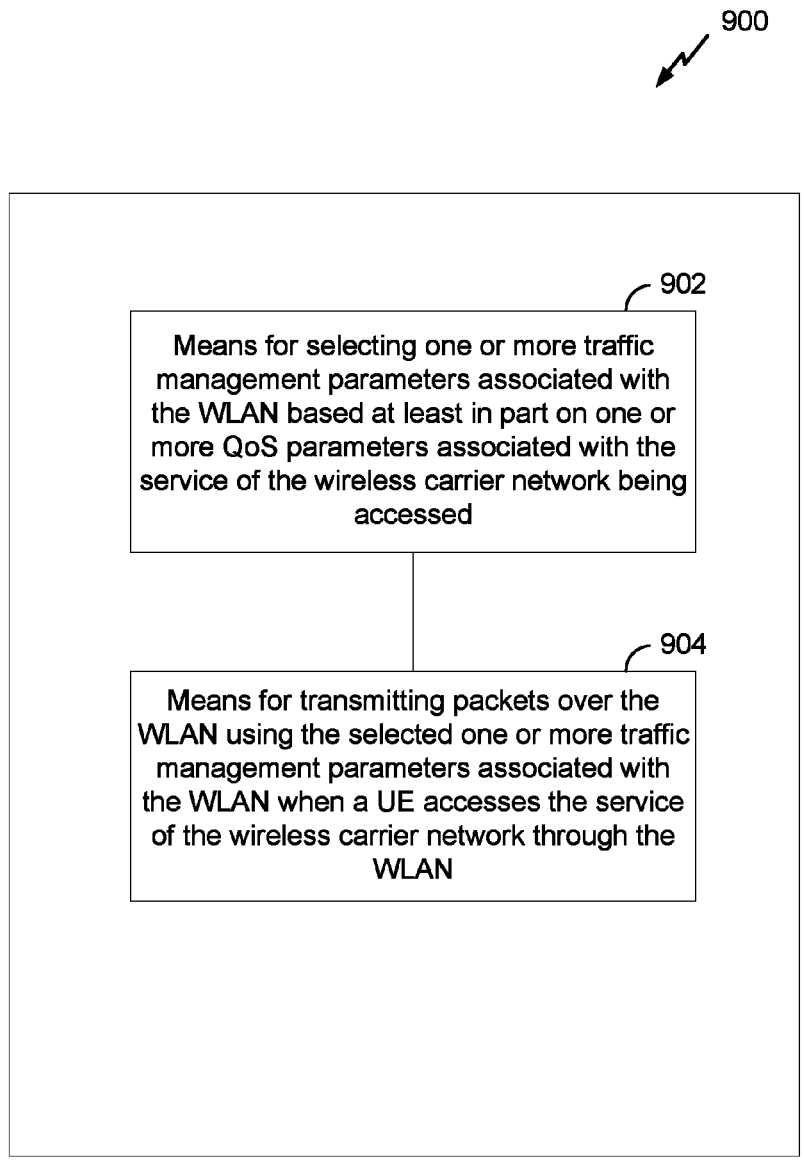
FIG. 9 illustrates a functional block diagram of an exemplary device that may be employed within the wireless communication network of FIG. 1.

FIG. 9 is a functional block diagram of an exemplary device 900 that may be employed within the wireless communication network 100. As an example, the device 900 may be a UE, such as the UE 206 of FIGS. 2A-B, an AP, such as the AP 404 of FIG. 4, or a trusted or untrusted wireless access gateway, such as the TWAG 406 of FIG. 4. The device 900 includes means 902 for selecting one or more traffic management parameters associated with the WLAN based at least in part on one or more quality of service (QoS) parameters associated with the service of the wireless carrier network being accessed. In an embodiment, means 902 for selecting one or more traffic management parameters associated with the WLAN based at least in part on one or more quality of service (QoS) parameters associated with the service of the wireless carrier network being accessed may be configured to perform one or more of the functions discussed above with respect to block 802. The device 900 further includes means 904 for transmitting packets over the WLAN using the selected one or more traffic management parameters associated with the WLAN when a UE accesses the service of the wireless carrier network through the WLAN. In an embodiment, means 904 for transmitting packets over the WLAN using the selected one or more traffic management parameters associated with the WLAN when a UE accesses the service of the wireless carrier network through the WLAN may be configured to perform one or more of the functions discussed above with respect to block 804.

Figure 10:
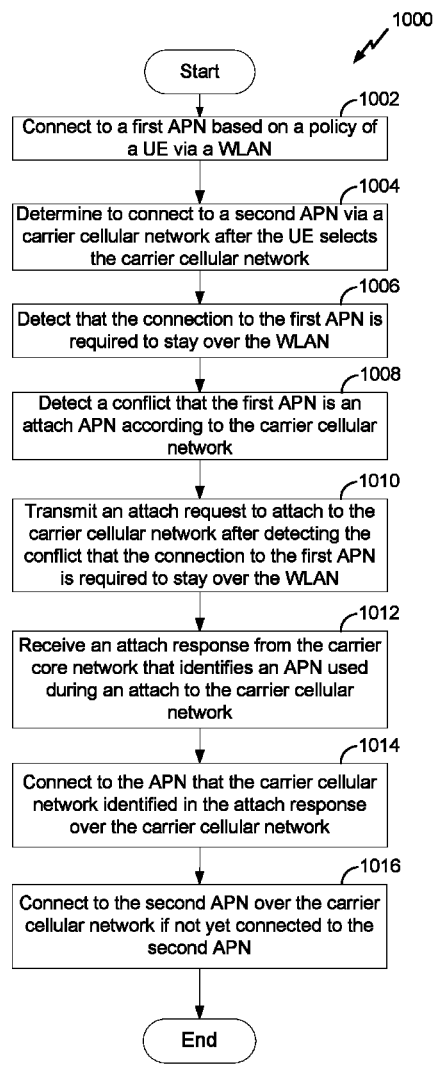
FIG. 10 illustrates a flowchart of a process for establishing a data communication pathway between network elements.

FIG. 10 is a flowchart of a process 1000 for establishing a data communication pathway between network elements. At block 1002, the process 1000 connects to a first access point name (APN) based on a policy of a UE. In an embodiment, the first APN establishes a connection between the UE and a packet data network gateway (PDN-GW) via a wireless local area network (WLAN).

At block 1004, the process 1000 determines to connect to a second APN via a carrier cellular network after the UE selects the carrier cellular network. In an embodiment, the carrier cellular network is an LTE network. At block 1006, the process 1000 detects that the connection to the first APN is required to stay over the WLAN.

At block 1008, the process 1000 detects a conflict that the first APN is an attach APN according to the carrier cellular network. At block 1010, the process 1000 transmits an attach request to attach to the carrier cellular network after detecting the conflict that the connection to the first APN is required to stay over the WLAN. In an embodiment, the attach request indicates NULL as the attach APN. At block 1012, the process 1000 receives an attach response from the carrier core network that identifies an APN used during an attach to the carrier cellular network. In an embodiment, the APN used during the attach to the carrier cellular network is the first APN. In another embodiment, the APN used during the attach to the carrier cellular network is the second APN. At block 1014, the process 1000 connects to the APN that the carrier cellular network identified in the attach response over the carrier cellular network. At block 1016, the process 1000 connects to the second APN over the carrier cellular network if not yet connected to the second APN.

Figure 11:
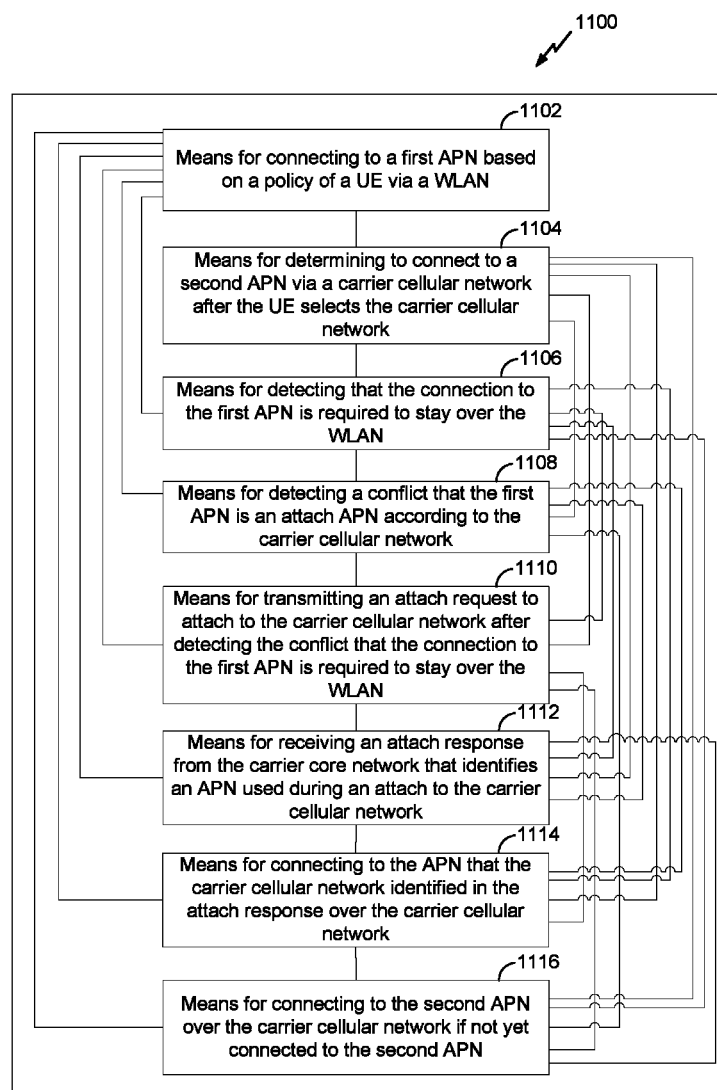
FIG. 11 illustrates a functional block diagram of an exemplary device that may be employed within the wireless communication network of FIG. 1.

FIG. 11 is a functional block diagram of an exemplary device 1100 that may be employed within the wireless communication network 100. As an example, the device 1100 may be a UE, such as the UE 206 of FIGS. 2A-B. The device 1100 includes means 1102 for connecting to a first access point name (APN) based on a policy of a UE. In an embodiment, means 1102 for connecting to a first access point name (APN) based on a policy of a UE be configured to perform one or more of the functions discussed above with respect to block 1002. The device 1100 further includes means 1104 for determining to connect to a second APN via a carrier cellular network after the UE selects the carrier cellular network. In an embodiment, means 1104 for determining to connect to a second APN via a carrier cellular network after the UE selects the carrier cellular network may be configured to perform one or more of the functions discussed above with respect to block 1004. The device 1100 further includes means 1106 for detecting that the connection to the first APN is required to stay over the WLAN. In an embodiment, means 1106 for detecting that the connection to the first APN is required to stay over the WLAN may be configured to perform one or more of the functions discussed above with respect to block 1006.

The device 1100 further includes means 1108 for detecting a conflict that the first APN is an attach APN according to the carrier cellular network. In an embodiment, means 1108 for detecting a conflict that the first APN is an attach APN according to the carrier cellular network may be configured to perform one or more of the functions discussed above with respect to block 1008. The device 1100 further includes means 1110 for transmitting an attach request to attach to the carrier cellular network after detecting the conflict that the connection to the first APN is required to stay over the WLAN. In an embodiment, means 1110 for transmitting an attach request to attach to the carrier cellular network after detecting the conflict that the connection to the first APN is required to stay over the WLAN may be configured to perform one or more of the functions discussed above with respect to block 1010. The device 1100 further includes means 1112 for receiving an attach response from the carrier core network that identifies an APN used during an attach to the carrier cellular network. In an embodiment, means 1112 for receiving an attach response from the carrier core network that identifies an APN used during an attach to the carrier cellular network may be configured to perform one or more of the functions discussed above with respect to block 1012. The device 1100 further includes means 1114 for connecting to the APN that the carrier cellular network identified in the attach response over the carrier cellular network. In an embodiment, means 1114 for connecting to the APN that the carrier cellular network identified in the attach response over the carrier cellular network may be configured to perform one or more of the functions discussed above with respect to block 1014. The device 1100 further includes means 1116 for connecting to the second APN over the carrier cellular network if not yet connected to the second APN. In an embodiment, means 1116 for connecting to the second APN over the carrier cellular network if not yet connected to the second APN may be configured to perform one or more of the functions discussed above with respect to block 1016.

Figure 12:
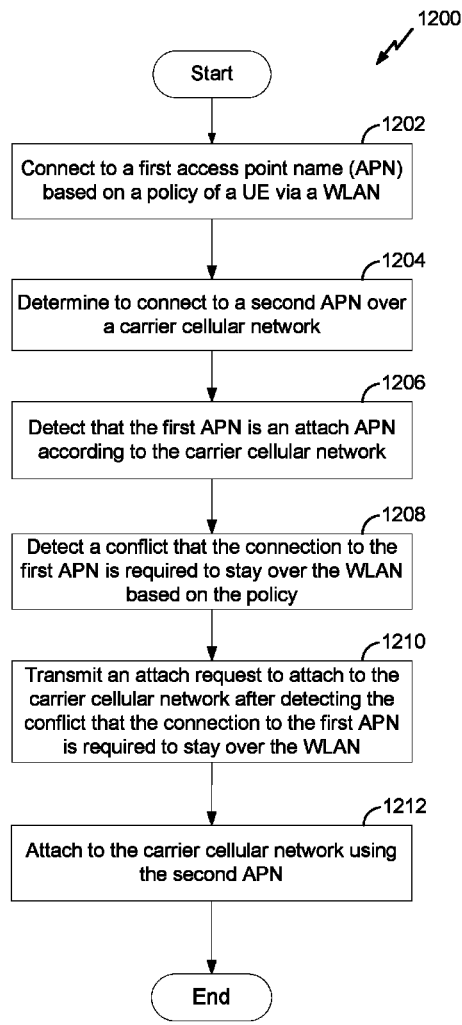
FIG. 12 illustrates a flowchart of a process for establishing a data communication pathway between network elements.

FIG. 12 is a flowchart of a process 1200 for establishing a data communication pathway between network elements. At block 1202, the process 1200 connects to a first access point name (APN) based on a policy of a UE. In an embodiment, the first APN establishes a connection between the UE and a packet data network (PDN) via a wireless local area network (WLAN).

At block 1204, the process 1200 determines to connect to a second APN over a carrier cellular network. In an embodiment, the carrier cellular network is an LTE network. At block 1206, the process 1200 detects that the first APN is an attach APN according to the carrier cellular network. At block 1208, the process 1200 detects a conflict that the connection to the first APN is required to stay over the WLAN based on the policy. At block 1210, the process 1200 transmits an attach request to attach to the carrier cellular network after detecting the conflict that the connection to the first APN is required to stay over the WLAN. In an embodiment, the attach request includes an indication that the second APN is the attach APN. At block 1212, the process 1200 attaches to the carrier cellular network using the second APN.

Figure 13:
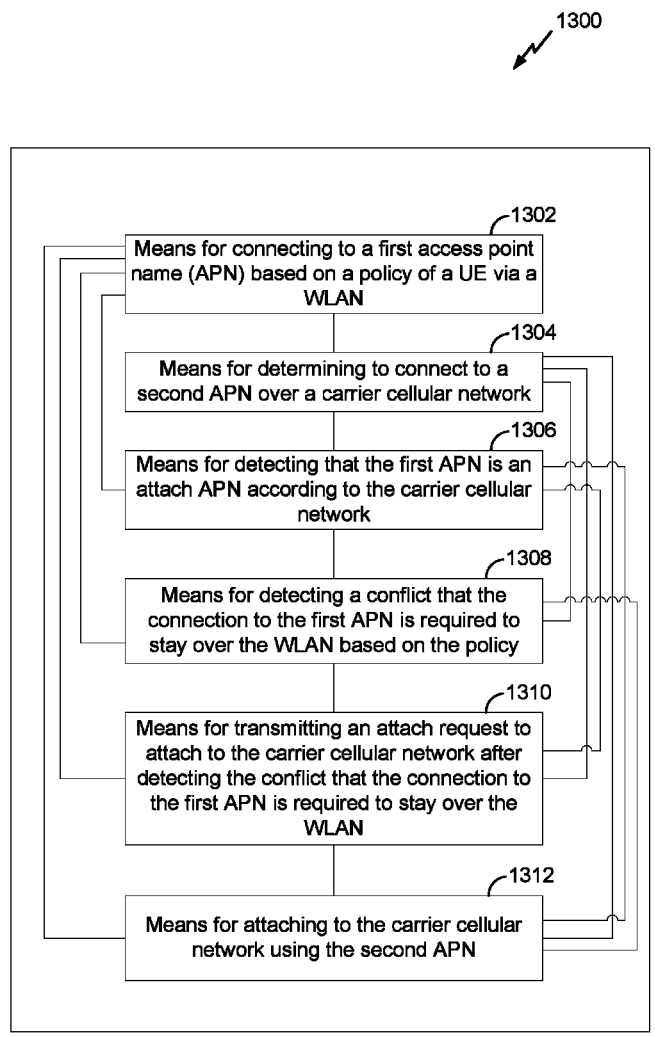
FIG. 13 illustrates a functional block diagram of an exemplary device that may be employed within the wireless communication network of FIG. 1.

FIG. 13 is a functional block diagram of an exemplary device 1300 that may be employed within the wireless communication network 100. As an example, the device 1300 may be a UE, such as the UE 206 of FIGS. 2A-B. The device 1300 includes means 1302 for connecting to a first access point name (APN) based on a policy of a UE. In an embodiment, means 1302 for connecting to a first access point name (APN) based on a policy of a UE be configured to perform one or more of the functions discussed above with respect to block 1202. The device 1300 further includes means 1304 for determining to connect to a second APN over a carrier cellular network. In an embodiment, means 1304 for determining to connect to a second APN over a carrier cellular network may be configured to perform one or more of the functions discussed above with respect to block 1204. The device 1300 further includes means 1306 for detecting that the first APN is an attach APN according to the carrier cellular network. In an embodiment, means 1306 for detecting that the first APN is an attach APN according to the carrier cellular network may be configured to perform one or more of the functions discussed above with respect to block 1206.

The device 1300 further includes means 1308 for detecting a conflict that the connection to the first APN is required to stay over the WLAN based on the policy. In an embodiment, means 1308 for detecting a conflict that the connection to the first APN is required to stay over the WLAN based on the policy may be configured to perform one or more of the functions discussed above with respect to block 1208. The device 1300 further includes means 1310 for transmitting an attach request to attach to the carrier cellular network after detecting the conflict that the connection to the first APN is required to stay over the WLAN. In an embodiment, means 1310 for transmitting an attach request to attach to the carrier cellular network after detecting the conflict that the connection to the first APN is required to stay over the WLAN may be configured to perform one or more of the functions discussed above with respect to block 1210. The device 1300 further includes means 1312 for attaching to the carrier cellular network using the second APN. In an embodiment, means 1312 for attaching to the carrier cellular network using the second APN may be configured to perform one or more of the functions discussed above with respect to block 1212.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for accessing a service of a wireless carrier network through a wireless local area network (WLAN), the method comprising:
   transmitting, by a user equipment, a request to establish a connection to access the service of the wireless carrier network through the WLAN;
   receiving a bearer setup request from a gateway, wherein the bearer setup request comprises one or more quality of service (QoS) parameters associated with the service of the wireless carrier network being accessed;
   mapping the one or more QoS parameters to one or more traffic management parameters associated with the WLAN, wherein the one or more traffic management parameters comprise a traffic specification;

transmitting a traffic specification addition request to an access point, wherein the traffic specification addition request comprises the traffic specification;

receiving a traffic specification addition response from the access point;

transmitting a bearer setup response to the gateway;

transmitting packets over the WLAN using the one or more traffic management parameters when accessing the service of the wireless carrier network through the WLAN; and enforcing the one or more traffic management parameters for communications to the wireless carrier network.

2. The method of claim 1, wherein mapping the one or more QoS parameters to one or more traffic management parameters comprises determining the traffic specification including at least one of a medium access control service data unit (MSDU) size, a minimum data rate, a mean data rate, a peak data rate, or a burst size based on the one or more QoS parameters.

3. The method of claim 2, further comprising requesting a medium time from the access point for a traffic stream based on the traffic specification.

4. The method of claim 1, wherein receiving a bearer setup request comprises receiving one or more evolved packet system (EPS) bearer QoS parameters.

5. The method of claim 1, wherein mapping the one or more QoS parameters to one or more traffic management parameters comprises mapping the EPS bearer QoS parameter to the traffic specification.

6. The method of claim 1, wherein receiving a bearer setup request from a gateway comprises receiving the bearer setup request from one of a trusted wireless access gateway or an untrusted wireless access gateway.

7. An apparatus for accessing a service of a wireless carrier network through a wireless local area network (WLAN), the apparatus comprising:

means for transmitting a request to establish a connection to access the service of the wireless carrier network through the WLAN;

means for receiving a bearer setup request from a gateway, wherein the bearer setup request comprises one or more quality of service (QoS) parameters associated with the service of the wireless carrier network being accessed;

means for mapping the one or more QoS parameters to one or more traffic management parameters associated with the WLAN, wherein the one or more traffic management parameters comprise a traffic specification;

means for transmitting a traffic specification addition request to an access point, wherein the traffic specification addition request comprises the traffic specification;

means for receiving a traffic specification addition response from the access point;

means for transmitting a bearer setup response to the gateway;

means for transmitting packets over the WLAN using the one or more traffic management parameters when accessing the service of the wireless carrier network through the WLAN; and means for enforcing the one or more traffic management parameters for communications to the wireless carrier network.

8. The apparatus of claim 7, wherein means for mapping one or more QoS parameters to one or more traffic management parameters comprises means for determining the traffic specification including at least one of a medium access control service data unit (MSDU) size, a minimum data rate, a mean data rate, a peak data rate, or a burst size based on the one or more QoS parameters.

9. The apparatus of claim 7, further comprising means for requesting a medium time from the access point for a traffic stream based on the traffic specification.

10. The apparatus of claim 7, wherein means for receiving a bearer setup request comprises means for receiving one or more evolved packet system (EPS) bearer QoS parameters.

11. The apparatus of claim 7, wherein means for mapping one or more QoS parameters to one or more traffic management parameters comprises means for mapping the EPS bearer QoS parameters to the traffic specification.

12. The apparatus of claim 7, wherein means for receiving a bearer setup request from a gateway comprises means for receiving the bearer setup request from one of a trusted wireless access gateway or an un trusted wireless access gateway.

13. A non-transitory computer-readable medium comprising code that, when executed, causes an apparatus to:

transmit a request to establish a connection to access a service of a wireless carrier network through a wireless local area network (WLAN);

receive a bearer setup request from a gateway, wherein the bearer setup request comprises one or more quality of service (QoS) parameters associated with the service of the wireless carrier network being accessed;

map the one or more QoS parameters to one or more traffic management parameters associated with the WLAN, wherein the one or more traffic management parameters comprise a traffic specification;

transmit a traffic specification addition request to an access point, wherein the traffic specification addition request comprises the traffic specification;

receive a traffic specification addition response from the access point;

transmit a bearer setup response to the gateway;

transmit packets over the WLAN using the one or more traffic management parameters when accessing the service of the wireless carrier network through the WLAN; and enforce the one or more traffic management parameters for communications to the wireless carrier network.

14. The medium of claim 13, further comprising code that, when executed, causes an apparatus to determine the traffic specification including at least one of a medium access control service data unit (MSDU) size, a minimum data rate, a mean data rate, a peak data rate, or a burst size based on the one or more QoS parameters.

15. The medium of claim 14, further comprising code that, when executed, causes an apparatus to request a medium time from the access point for a traffic stream based on the traffic specification.

16. The medium of claim 13, further comprising code that, when executed, causes an apparatus to receive one or more evolved packet system (EPS) bearer QoS parameters.

17. The medium of claim 13, further comprising code that, when executed, causes an apparatus to map the one or more EPS bearer QoS parameter to the traffic specification.

18. The medium of claim 13, further comprising code that, when executed, causes an apparatus to receive the bearer setup request from one of a trusted wireless access gateway or an untrusted wireless access gateway.

19. An apparatus for accessing a service of a wireless carrier network through a wireless local area network (WLAN), the apparatus comprising:
- a transmitter configured to transmit a request to establish a connection to access the service of the wireless carrier network through the WLAN;
- a receiver configured to receive a bearer setup request from a gateway, wherein the bearer setup request comprises one or more quality of service (QoS) parameters associated with the service of the wireless carrier network being accessed; and
- a processor configured to map the one or more QoS parameters to one or more traffic management parameters associated with the WLAN, wherein the one or more traffic management parameters comprise a traffic specification,
- wherein the transmitter is further configured to transmit a traffic specification addition request to an access point, wherein the traffic specification addition request comprises the traffic specification,
- wherein the receiver is further configured to receive a traffic specification addition response from the access point,
- wherein the transmitter is further configured to transmit a bearer setup response to the gateway,
- wherein the transmitter is further configured to transmit packets over the WLAN using the one or more traffic management parameters when accessing the service of the wireless carrier network through the WLAN, and
- wherein the processor is further configured to enforce the one or more traffic management parameters for communications to the wireless carrier network.

20. The apparatus of claim 19, wherein the traffic specification comprises at least one of a medium access control service data unit (MSDU) size, a minimum data rate, a mean data rate, a peak data rate, or a burst size based on the one or more QoS parameters.

21. The apparatus of claim 20, further comprising a pathway selector configured to request a medium time from the access point for a traffic stream based on the traffic specification.

22. The apparatus of claim 19, wherein the one or more QoS parameters comprise one or more evolved packet system (EPS) bearer QoS parameters.

23. The apparatus of claim 19, wherein the processor is further configured to map the one or more EPS bearer QoS parameters to the traffic specification.

24. The apparatus of claim 19, wherein the gateway comprises one of a trusted wireless access gateway or an untrusted wireless access gateway.

* * * * *